(12) United States Patent
Jiang et al.

(10) Patent No.: US 9,655,092 B2
(45) Date of Patent: May 16, 2017

(54) METHOD AND SYSTEM FOR SELF-ADAPTIVELY TRANSMITTING COMMUNICATION SIGNALS

(71) Applicant: Goertek, Inc., Weifang, ShanDong Province (CN)

(72) Inventors: Binbin Jiang, Weifang (CN); Xin'ai Liu, Weifang (CN); Chongle Wang, Weifang (CN)

(73) Assignee: GOERTEK, INC., Weifang, Shandong Province (CN)

( * ) Notice: Subject to any disclaimer, the term of this patent is extended or adjusted under 35 U.S.C. 154(b) by 64 days.

(21) Appl. No.: 14/371,119

(22) PCT Filed: Feb. 27, 2013

(86) PCT No.: PCT/CN2013/071947
§ 371 (c)(1),
(2) Date: Jul. 8, 2014

(87) PCT Pub. No.: WO2013/127340
PCT Pub. Date: Sep. 6, 2013

(65) Prior Publication Data
US 2015/0245321 A1    Aug. 27, 2015

(30) Foreign Application Priority Data
Feb. 27, 2012    (CN) .......................... 2012 1 0046257

(51) Int. Cl.
*H04W 64/00* (2009.01)
*H04W 72/04* (2009.01)
(Continued)

(52) U.S. Cl.
CPC ......... *H04W 72/042* (2013.01); *H04L 67/104* (2013.01); *H04L 67/1063* (2013.01);
(Continued)

(58) Field of Classification Search
CPC ...... H04L 67/104; H04W 4/02; H04W 4/023; H04W 72/042; H04W 4/001; H04W 64/003; H04W 76/02
(Continued)

(56) References Cited

U.S. PATENT DOCUMENTS 6,188,771 B1 *  2/2001  Horrall ................. G10K 11/175
                                                    381/73.1
6,195,022 B1 *  2/2001  Yamakita ................. G07C 1/10
                                                    340/539.1
(Continued)

FOREIGN PATENT DOCUMENTS

| CN | 101574011 | 11/2009 |
|----|-----------|---------|
| CN | 102595317 | 7/2012  |

(Continued)

OTHER PUBLICATIONS

CN 101574911 A—English Translation.*

*Primary Examiner* — Melvin Marcelo
*Assistant Examiner* — Natali N Pascual Peguero
(74) *Attorney, Agent, or Firm* — Boyle Frederickson, S.C.

(57) ABSTRACT

Disclosed is a method and system for self-adaptively transmitting communication signals. The method comprises: a host acquires its own position information and position information of each terminal, and then calculates to acquire a relative position relationship between the host and each terminal according to the acquired position information; and the host matches each communication signal to be transmitted with each terminal according to the relative position relationship between the host and each terminal, and wirelessly transmits corresponding communication signals to each terminal according to the matched correspondence. By means of the technical scheme of the present invention, the complex wiring and wire plugging processes of wired trans-
(Continued)

mission can be omitted, also the self-adapting transmission of signals is achieved, and the working efficiency is improved.

8 Claims, 7 Drawing Sheets

(51) Int. Cl.
*H04W 4/02* (2009.01)
*H04L 29/08* (2006.01)
*H04W 4/00* (2009.01)
*H04W 76/02* (2009.01)

(52) U.S. Cl.
CPC ............... *H04L 67/18* (2013.01); *H04W 4/02* (2013.01); *H04W 4/023* (2013.01); *H04W 72/048* (2013.01); *H04W 4/001* (2013.01); *H04W 64/003* (2013.01); *H04W 76/02* (2013.01)

(58) Field of Classification Search
USPC ........................................................ 370/329
See application file for complete search history.

(56) References Cited

U.S. PATENT DOCUMENTS

| 7,231,553 | B2* | 6/2007 | Stephens | G06F 11/2635 |
| | | | | 710/303 |
| 8,060,626 | B2* | 11/2011 | Roy | H04L 29/1249 |
| | | | | 709/228 |
| 2011/0314168 | A1* | 12/2011 | Bathiche | H04W 12/06 |
| | | | | 709/228 |
| 2013/0045759 | A1* | 2/2013 | Smith | H04W 64/00 |
| | | | | 455/456.6 |

FOREIGN PATENT DOCUMENTS

| CN | 202652529 | 1/2013 |
| WO | 2004081602 | 9/2004 |

* cited by examiner

METHOD AND SYSTEM FOR SELF-ADAPTIVELY TRANSMITTING COMMUNICATION SIGNALS

TECHNICAL FIELD

The present invention relates to the technical field of signal transmission, in particular, to a method and system for self-adaptively transmitting communication signals.

BACKGROUND ART

At present, a variety of audio signals, video signals and control signals and so on need to be transmitted in the field of automatic control and communication and so on. Moreover, the application of multi-channel signal communication is spread widely. For example, the surround sound system of 5.1-channel, the traffic light signal control system and the large-scale outdoor multi-screen assembling display system and so on commonly used nowadays all have the problem of matching multi-channel communication signals with different terminals.

The traditional solution is to firstly define and deploy the terminal connection (wiring process) based on a specific model and then connect to a corresponding signal channel through wire plugging (wired access mode). Such deployment of wired connection is not difficult if there is a small number of terminals, but when there is a large number of terminals, e.g., a large-scale outdoor equipment or a live concert sound equipment in which dozens or even hundreds (e.g. a large LED outdoor screen) of signal terminals may be involved, it will be complicated, time-consuming and unreliable to connect to the corresponding audio terminal by wire plugging according to the output interface of the power amplifier.

SUMMARY OF THE INVENTION

In view of this, the present invention provides a method and system for self-adaptively transmitting communication signals. By means of the technical scheme of the present invention, the complex wiring and wire plugging processes of wired transmission can be omitted, the self-adaptive transmission of signals is implemented, and the working efficiency is improved.

To achieve the above object, the technical scheme of the present invention is carried out as follows:

The present invention discloses a method for self-adaptively transmitting communication signals, applied to a system comprising one host and a plurality of terminals, the method comprising:

the host acquires its own position information and the position information of each terminal, and then calculates to acquire a relative positional relationship between the host and each terminal according to the acquired positional information: and the host matches each communication signal to be transmitted with each terminal according to the relative positional relationship between the host and each terminal, and wirelessly transmits corresponding communication signals to each terminal according to the matched correspondence.

The present invention further discloses a system for self-adaptively transmitting communication signals, comprising: one host and a plurality of terminals;

the host is configured to acquire its own position information and the position information of each terminal, calculate to acquire a relative positional relationship between the host and each terminal according to the acquired positional information, match each communication signal to be transmitted with each terminal according to the relative positional relationship between the host and each terminal, and wirelessly transmit corresponding communication signals to each terminal according to the matched correspondence; and the terminals are configured to acquire their respective position information, send the position information to the host, and receive the communication signals transmitted from the host.

As can be seen from the foregoing, in the technical scheme of "a system comprising one host and a plurality of terminals, the host acquiring its own position information and the position information of each terminal and calculating to acquire a relative positional relationship between the host and each terminal according to the acquired positional information, and the host matching each communication signal to be transmitted with each terminal according to the relative positional relationship between the host and each terminal and wirelessly transmitting corresponding communication signals to each terminal according to the matched correspondence" of the present invention, since wireless transmission is adopted between the host and each terminal, the complex wiring and wire plugging processes are avoided. Moreover, since the host acquires a relative positional relationship between itself and each terminal, matches communication signals with the terminals according to the relative positional relationship, and then performs wireless transmission of the communication signals, the self-adaptive transmission of wireless signals can be achieved.

DETAILED DESCRIPTION OF THE EMBODIMENTS

To make the object, technical scheme and advantages of the present invention clearer, the embodiments of the present application are described in further detail with reference to the drawings.

Figure 1:
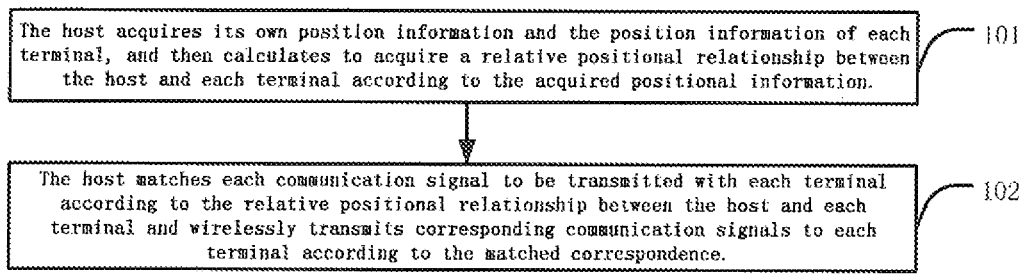
FIG. 1 is a flowchart of a method for self-adaptively transmitting communication signals in an embodiment of the present invention.

FIG. 1 is a flowchart of a method for self-adaptively transmitting communication signals in the embodiment of the present invention, the method being applied to a system comprising one host and a plurality of terminals. As shown in FIG. 1, the method comprises:

101, the host acquires its own position information and the position information of each terminal, and then calculates to acquire a relative positional relationship between the host and each terminal according to the acquired positional information; and 102, the host matches each communication signal to be transmitted with each terminal according to the relative positional relationship between the host and each terminal, and wirelessly transmits corresponding communication signals to each terminal according to the matched correspondence.

By means of the method shown in FIG. 1, the complex wiring and wire plugging processes of wired transmission can be omitted, the self-adaptive transmission of signals is achieved, and the working efficiency is improved.

The method shown in FIG. 1 can be applied to a system comprising a single host, where the host and the terminals in the method shown in FIG. 1 are different modules in a same device. The method shown in FIG. 1 can also be applied to a multi-component system, where the host and the terminals in the method shown in FIG. 1 are all separate devices.

In the multi-component system, the host and the terminals are connected together in a wireless way such as Bluetooth, WiFi and so on.

The host can send not only audio signals, but also control signals, video signals and so on. The terminals can be sound boxes, signal lights, split-screen TVs and so on.

The specific implementation of acquiring its own position information and the position information of each terminal by the host in step 101 of FIG. 1 comprises:

the host and the terminals each comprise a locating module, and the host acquires its own position information and the position information of each terminal through the collaborative work between the locating modules.

In the present invention, the locating modules of the host and each terminal may acquire and calculate the position information using any one of the locating methods in the prior art. Thus, such a locating module may be: a GPS module, a microphone array, a 3G network receiver or the like.

Figure 2:
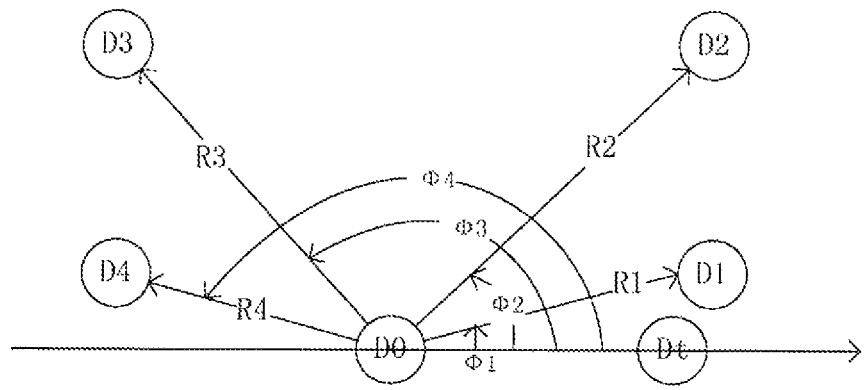
FIG. 2 is a schematic view of the calculation of the position information in an embodiment of the present invention.

Here is given an example of a method for calculating the position information used in the embodiment of the present invention (see FIG. 2).

FIG. 2 is a schematic view of the calculation of the position information in the embodiment of the present invention. Referring to FIG. 2, by pre-processing, the position information acquired by the locating modules of the host and each terminal is formed into a coordinate point $(X_n, Y_n)$ in a two-dimensional coordinate system, wherein the position information of the host comprises two position points, whose coordinates are D0 $(X_0, Y_0)$ and Dt $(X_t, Y_t)$ respectively, and the direction vector (D0→Dt) defined by these two points is used as a datum for determining the polar coordinate of the position point of each terminal, wherein D0 is used as the pole in the polar coordinate. By the calculation in the two-dimensional polar coordinate system, the directivity angle and the distance information $(\Phi_n, R_n)$ between each terminal and the host can be acquired, and by sorting based on the value of Φ, a deflection angle coordinate sequence is obtained and numbered as (1 . . . n). The serial number of each terminal coordinate is its communication position coordinate in the system.

Step 102, "the host matches each communication signal to be transmitted with each terminal", in FIG. 1 can be carried out in many ways. In the present invention, two ways are given, which are as shown in FIG. 3 and FIG. 4 respectively.

Figure 3:
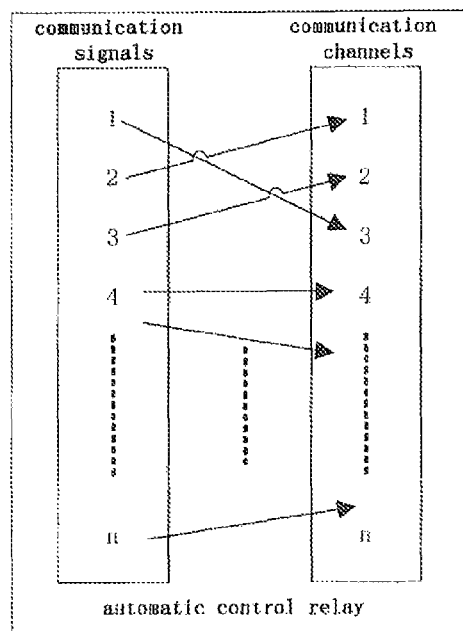
FIG. 3 is a schematic view of an automatic control relay used by the host for matching communication signals with terminals in an embodiment of the present invention.

FIG. 3 is a schematic view of an automatic control relay used by the host for matching communication signals with terminals in the embodiment of the present invention. Referring to FIG. 3, the host firstly uses an automatic control relay to link each terminal to a communication channel of the automatic control relay, and then docks communication signals with the communication channels by switching the physical link in the automatic control relay.

Figure 4:
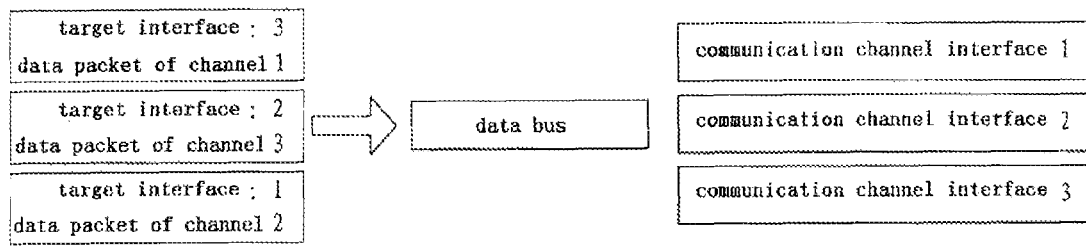
FIG. 4 is a schematic view of matching communication signals with terminals using a software matching mode in an embodiment of the present invention.

FIG. 4 is a schematic view of matching communication signals with terminals using a software matching mode in the embodiment of the present invention. Referring to FIG. 4, the host firstly matches each terminal with each communication channel interface, the communication channel interfaces of different addresses transmit different data packets to achieve the correspondence of the addresses in software such that "software bus" control logic is achieved. Then, the host docks each communication signal with each communication channel interface by modifying the target communication channel interface address of each communication signal data packet.

If the method shown in FIG. 1 is applied to a system consisting of a plurality of pear-to-pear devices, then prior to all of the above steps, the method further comprises: selecting, in a preset way, one device from the plurality of peer-to-peer devices as the host, the other devices being the terminals. Here, the predetermining way may be: artificially configuring and setting the role of host and the role of terminals, or determining the role of host and the role of terminals by negotiation between the peer-to-peer devices.

The following are given several embodiments of the method of FIG. 1.

Embodiment 1

This embodiment mainly achieves adaptive transmission of sound signals. The host is a device for playing audio signals, and the terminals are sound boxes.

Figure 5:
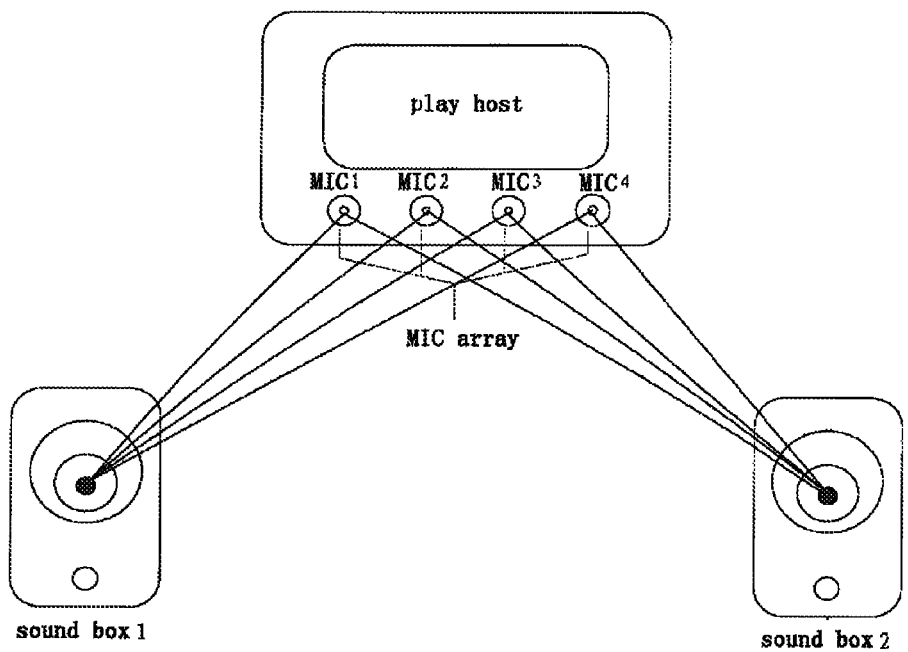
FIG. 5 is a schematic view of an audio playing system in an embodiment of the present invention.

FIG. 5 is a schematic view of an audio playing system in the embodiment of the present invention. As shown in FIG. 5, the audio playing system comprises one play host for playing music and two sound boxes. The play host and the sound boxes themselves all support a wireless communication protocol and can wirelessly communicate with each other. The specific steps are as follows:

1) opening the wireless communication protocol of all members in the system; and searching and connecting the other members of the audio playing system, i.e. sound box 1 and sound box 2, by the play host;

2) determining the position of sound box 1 and sound box 2 relative to the host, wherein the play host sends control signals to sound box 1 and sound box 2 respectively through the wireless communication protocol, sound box 1 and sound box 2 each play an audio file and the play host receives the audio files, and the microphone array on the play host determines the position of sound box 1 and sound box 2 relative to itself by a sound source localization algorithm. As shown in FIG. 5, when sound box 1 and sound box 2 sound respectively, the four microphones of the microphone array on the play host will receive the sound at different times. Thus, the difference in the time when the sound signals sent by the sound boxes reach the four microphones of the host system can be calculated by the system. It is required that the space from the leftmost microphone to the rightmost microphone cannot be less than 5 cm under 16K sampling frequency and cannot be less than 2 cm under 48K sampling frequency. A specific orientation angle of the sound box may also be acquired if directional microphones having directional sensation are used, which will facilitate the calculation better in the case of multiple sound boxes. t(1,1) is recorded as the moment when microphone 1 receives sound from sound box 1 and t (4,1) as the moment when microphone 4 receives sound from sound box 1, we define that if t (1,1)>t (4,1), then the sound box 1 is in the left of the host, otherwise, it is in the right of the host, so the signal of the left channel is sent to sound box 2 and the signal of the right channel is sent to sound box 1.

3) When the position of sound box 1 and sound box 2 relative to the host has been determined, the play host sends the audio signal of the left channel to sound box 2 and the audio signal of the right channel to sound box 1. Then, sound box 1 and sound box 2 can respectively receive and output their own audio signal through their own wireless communication protocol.

It can be seen from the above embodiment that once the sound boxes are placed in position, the play host automatically determines the relative position of each sound box and sends audio signals of the corresponding sound channel to each sound box so as to achieve adaptive transmission of sound signals. Thus, many unnecessary troubles in wire plugging can be reduced.

Figure 6:
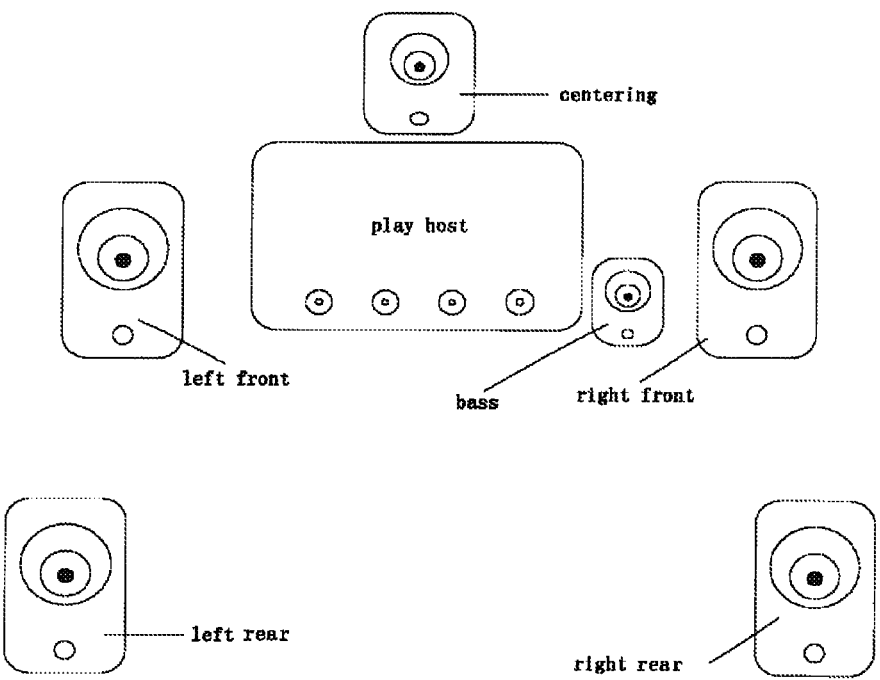
FIG. 6 is a schematic view of a 5.1-channel system in an embodiment of the present invention.

FIG. 6 is a schematic view of a 5.1-channel system in the embodiment of the present invention. As shown in FIG. 6, it is a 5.1-channel system. The position of 6 sound boxes relative to the host can also be determined by the above position-determining method. The play host will send audio signals of different channels to the corresponding sound boxes and the sound boxes will receive and output their own audio signals.

Embodiment 2

This embodiment mainly achieves adaptive transmission of control signals. The host is a control host and the terminals are signal lights.

There are many applications of control signals, such as the switch of traffic lights and the state of ON/OFF of a device.

Figure 7:
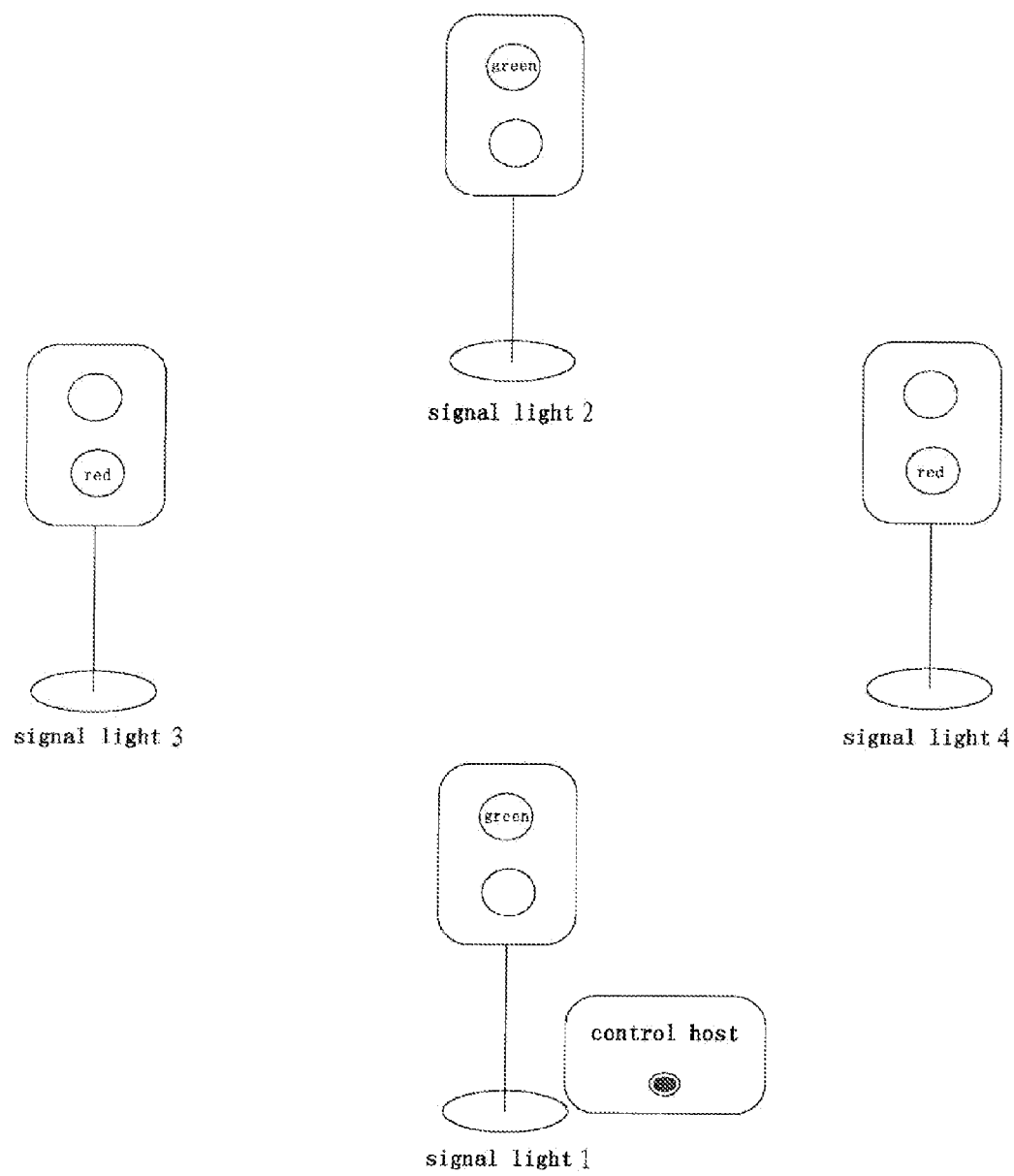
FIG. 7 is a schematic view of a signal light system in an embodiment of the present invention.

FIG. 7 is a schematic view of a signal light system in the embodiment of the present invention. As shown in FIG. 7, the signal light system comprises one control host and at least two signal lights, wherein each signal light can display in two states, i.e., red or green, and the control host and the signal lights are all equipped with a locating device. In FIG. 7, signal light 1 and signal light 2 are grouped into a group, and signal light 3 and signal light 4 are grouped into another group. Certainly, the grouping of the signal lights can be changed according to the requirement. The grouping in this embodiment is only a possible case. The control host can determine the position of the four signal lights relative to itself by a predetermined method for calculating the position information. When the control host finds that signal light 1 is beside itself and signal light 2 is in the distance (opposite), signal lights 1 and 2 are grouped into one group, and signal lights 3 and 4 are in the left and right sides of the control host respectively, so signal lights 3 and 4 are grouped into another group. After determining the position, the control host sends the control signals that need to be displayed to the two groups respectively in accordance with the grouping manner. The switch of the control signals and the communication channels can be achieved by an automatic control relay in the control host.

Figure 8:
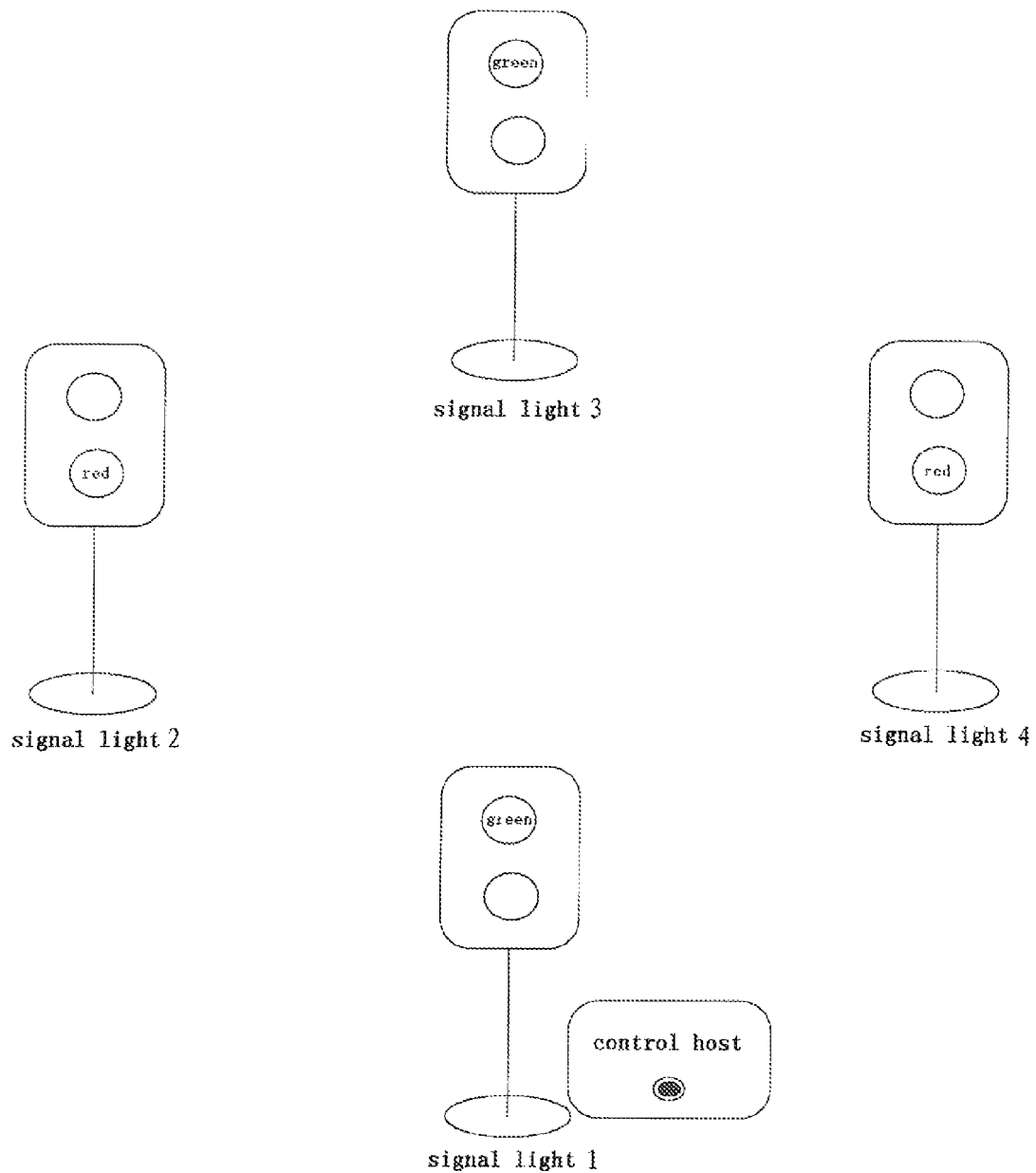
FIG. 8 is a schematic view of the case where the positions of signal lights 2 and 3 of the embodiment shown in FIG. 7 have been exchanged.

FIG. 8 is a schematic view of the case where the positions of signal lights 2 and 3 of the embodiment shown in FIG. 7 have been exchanged. As shown in FIG. 8, the control host re-locates the relative position of the signal lights and sends corresponding control signals to the four signal lights after having re-positioned the relative position of the signal lights. Thus signal light 2 and signal light 4 form a group and share the same communication channel, and signal light 3 and signal light 1 form another group and share another communication channel. In this way, self-adaptation of control signals is realized.

Figure 9:
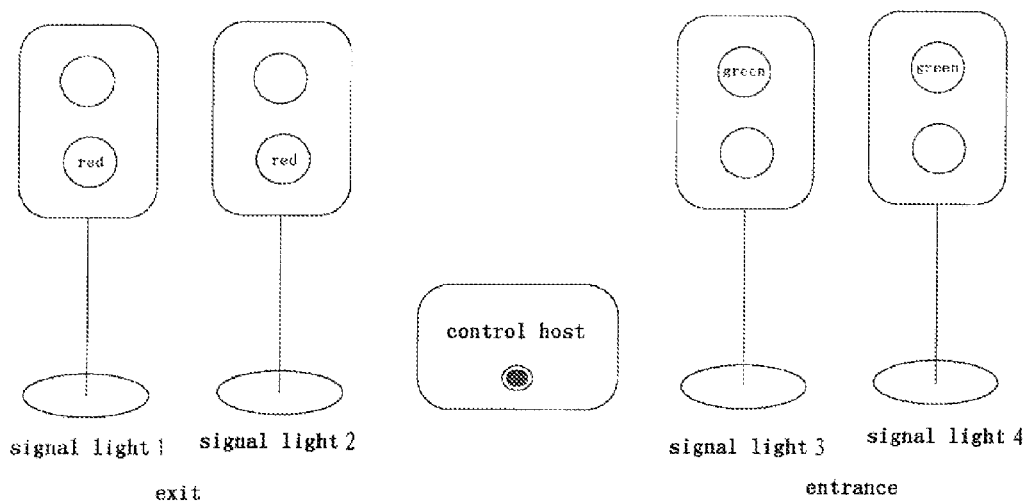
FIG. 9 is a schematic view of a signal light system in cinema in an embodiment of the present invention.

The scenario example of the above application: taking entrance and exit in cinema as an example, it can be achieved by the method of this embodiment that the entrance is represented by green light and the exit is represented by red light. The control manner can be that the signal light in the left of the control host is in red and the signal light in the right of the control host is in green. The placing mode may be as shown in FIG. 9. FIG. 9 is a schematic view of a signal light system in cinema in the embodiment of the present invention. Thus, when the position of the entrance and exit needs to be changed, as long as the control host re-determines the respective position of them, the control signals can be switched.

Embodiment 3

This embodiment mainly achieves adaptive transmission of video signals. The host is a device for playing video signals, and the terminals are display screens.

Figure 10:
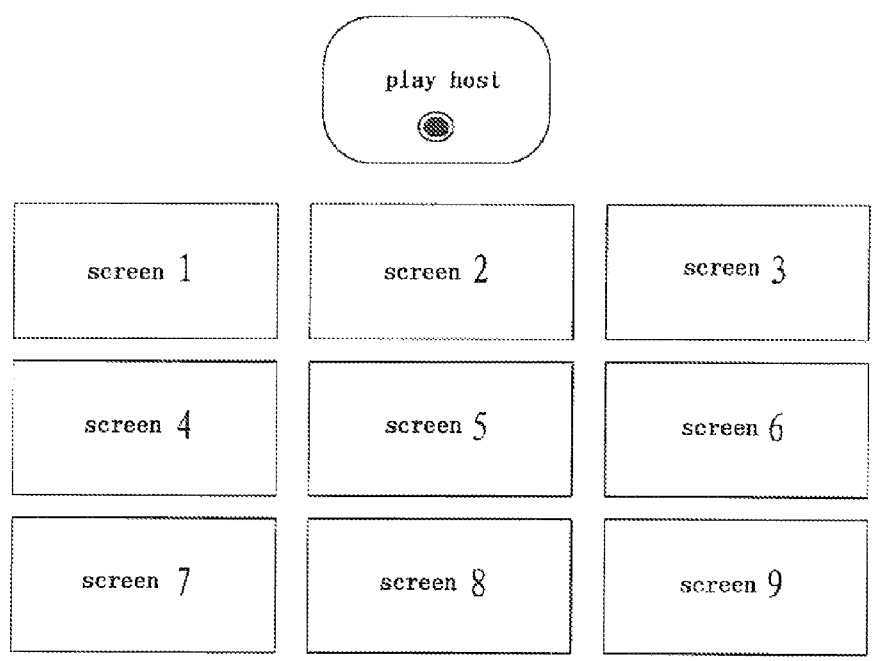
FIG. 10 is a schematic view of a split-screen television in an embodiment of the present invention.

FIG. 10 is a schematic view of a split-screen television in the embodiment of the present invention. As shown in FIG. 10, the split-screen television comprises one play host and nine screens. The play host and the nine screens all support a wireless communication protocol, and each of them is equipped with a locating device. The play host can determine the relative position of the nine screens through a predetermined method of calculating position information and then output signals of different screens to the corresponding screens through the wireless communication protocol, i.e., transmitting a signal corresponding to screen 1 to screen 1, transmitting a signal corresponding to screen 2 to screen 2, transmitting a signal corresponding to screen 3 to screen 3, and so on. Each screen can receive its own signal through its own wireless receiving apparatus and display the signal.

Thus, as long as the play host determines the position of each screen relative to itself, it can output different video signals to the corresponding screens without need of correlating with each screen by wire plugging every time.

Based on the above embodiment, a system for self-adaptively transmitting communication signals is provided.

Figure 11:
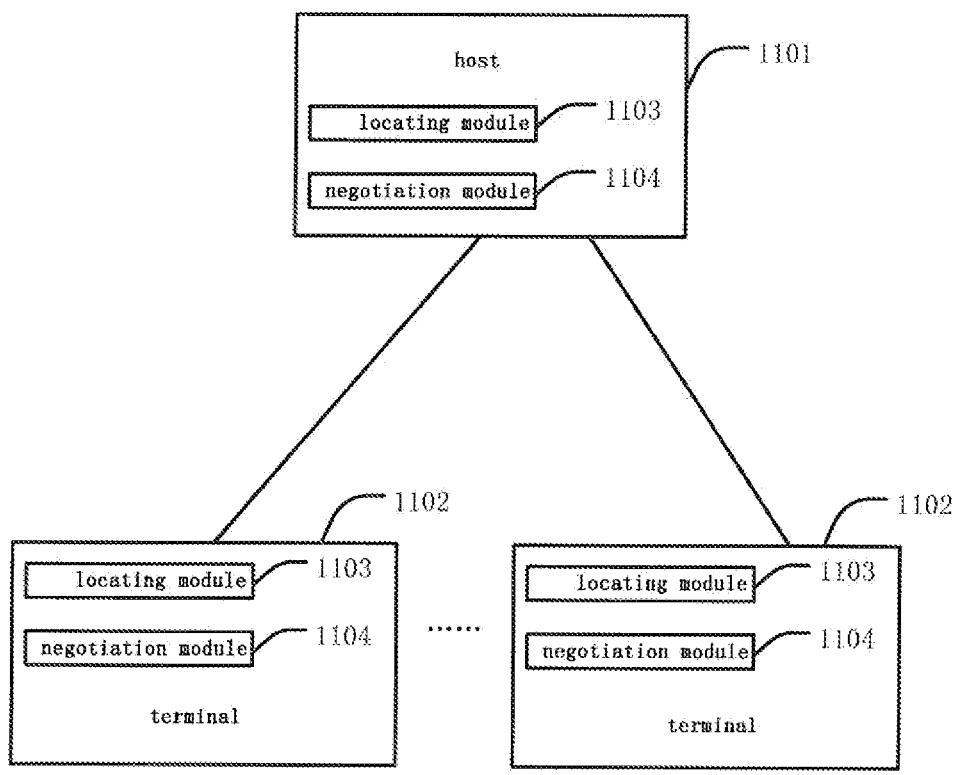
FIG. 11 is a schematic view of a system for self-adaptively transmitting communication signals in an embodiment of the present invention.

FIG. 11 is schematic view of a system for self-adaptively transmitting communication signals in the embodiment of the present invention. As shown in FIG. 11, the system comprises: one host 1101 and a plurality of terminals 1102;

the host 1101 is configured to acquire its own position information and the position information of each terminal 1102, calculate to acquire a relative positional relationship between itself and each terminal 1102 according to the acquired positional information, match each communication signal to be transmitted with each terminal 1102 according to the relative positional relationship between itself and each terminal 1102, and wirelessly transmit corresponding communication signals to each terminal 1102 according to the matched correspondence; and the terminals 1102 are configured to acquire their own position information, send the position information to the host 1101, and receive the communication signals transmitted from the host 1101.

In FIG. 11, the host 1101 and the terminals 1102 each comprise a locating module 1103. The host 1101 acquires its own position information and the position information of each terminal 1102 through the collaborative work between the locating modules 1103.

The locating module 1103 may be a GPS module, a microphone array, a 3G network receiver or the like.

In FIG. 11, the host may comprise an automatic control relay (not shown in FIG. 10).

The host 1101 is configured to firstly match each terminal with communication channels of the automatic control relay and then dock each communication signal with each communication channel by switching the physical link in the automatic control relay.

Or the host in FIG. 11 may not comprise an automatic control relay. The host uses a software matching mode to firstly link the terminals with communication channel interfaces, and that modify the target communication channel interface address of each communication signal data packet so as to dock each communication signal with each communication channel interface, wherein the communication channel interfaces of different addresses transmit different data packets.

In FIG. 11, the host 1101 is a device for playing audio signals, and the terminals 1102 are sound boxes;
or, the host 1101 is a control host, and the terminals 1102 are signal lights;
or, the host 1101 is a device for playing video signals, and the terminals 1102 are display screens.

In one embodiment of the present invention, when the system for self-adaptively transmitting communication signals consists of a plurality of peer-to-peer devices, the plurality of peer-to-peer devices each comprise a negotiation module. The role of the host and the role of the terminals are determined by the negotiation communication between the negotiation modules. For example, in the system shown in FIG. 11, the host 1101 and the terminals 1102 are a plurality of peer-to-peer devices, the host 1101 and the terminals 1102 each comprise a negotiation module 1104, and the role of the host and the role of terminals are determined by the negotiation communication between the negotiation modules 1104.

In summary, in the technical scheme of "a system comprising one host and a plurality of terminals, the host acquiring its own position information and the position information of each terminal and calculating to acquire a relative positional relationship between the host and each terminal according to the acquired positional information and the host matching each communication signal to be transmitted with each terminal according to the relative positional relationship between the host and each terminal and wirelessly transmitting corresponding communication signals to each terminal according to the matched correspondence" of the present invention, since wireless transmission is adopted between the host and each terminal, the complex wiring and wire plugging processes are avoided. Moreover, since the host acquires a relative positional relationship between itself and each terminal, matches communication signals with the terminals according to the relative positional relationship, and then performs wireless transmission of the communication signals, the self-adaptive transmission of wireless signals can be achieved.

The foregoing is only preferred embodiments of the present invention, which is not intended to limit the scope of the present invention. Any modification, equivalent replacement and improvement within the spirit and principle of the present invention shall be included in the protection scope of the present invention.

The invention claimed is:

1. A method for self-adaptively transmitting communication signals, characterized in that the method is applied to a system comprising one host and a plurality of terminals, the method comprising:

the host acquires its own position information and the position information of each terminal, and then calculates to acquire a relative positional relationship between the host and each terminal according to the acquired positional information; and the host matches each communication signal to be transmitted with each terminal according to the relative positional relationship between the host and each terminal, and wirelessly transmits corresponding communication signals to each terminal according to the matched correspondence, the communication signals include one or more of the following signal types: audio signals, control signals, and video signals;

wherein:

each of the host and the terminals include a locating module; and the host acquires its own position information and the position information of each terminal through the collaborative work between the locating modules;

wherein the position information of the host comprises two position points, whose coordinates are D0 (X0, Y0) and Dt (Xt, Yt) respectively, and the direction vector (D0→Dt) defined by these two points is used as a datum for determining the polar coordinate of the position point of each terminal;

the host matching each communication signal to be transmitted with each terminal includes:

the host using an automatic control relay to firstly link each terminal with communication channels of the automatic control relay and then dock each communication signal with each communication channel by switching the physical link in the automatic control relay; or the host using a software matching mode to firstly match each terminal with each communication channel interface and then dock each communication signal with each communication channel interface by modifying the target communication channel interface address of each communication signal data packet, wherein communication channel interfaces of different addresses transmit different data packets.

2. The method according to claim 1, characterized in that the locating module is a GPS module, a microphone array, or a 3G network receiver.

3. The method according to claim 1, characterized in that, the host is a device for playing audio signals, and the terminals are sound boxes;

or, the host is a control host, and the terminals are signal lights;

or, the host is a device for playing video signals, and the terminals are display screens.

4. The method according to claim 1, characterized in that, when being applied to a system consisting of a plurality of peer-to-peer devices, the method further comprises:

selecting, in a preset way, a device from the plurality of peer-to-peer devices as the host, and the other devices as terminals.

5. A system for self-adaptively transmitting communication signals, characterized in that the system comprises one host and a plurality of terminals;

the host is configured to acquire its own position information and the position information of each terminal, calculate to acquire a relative positional relationship between the host and each terminal according to the acquired positional information, match each communication signal to be transmitted with each terminal according to the relative positional relationship between the host and each terminal, and wirelessly transmits corresponding communication signals to each terminal according to the matched correspondence; and the terminals are configured to acquire their respective position information, send the position information to the host, and receive the communication signals transmitted from the host, the communication signals including one or more of the following signal types: audio signals, control signals, and video signals;

wherein:

each of the host and the terminals include a locating module; and the host acquires its own position information and the position information of each terminal through the collaborative work between the locating modules;

wherein the position information of the host comprises two position points, whose coordinates are D0 (X0, Y0) and Dt (Xt, Yt) respectively, and the direction vector (D0→Dt) defined by these two points is used as a datum for determining the polar coordinate of the position point of each terminal;

if the host includes an automatic control relay, the host is configured to firstly link each terminal with communication channels of the automatic control relay and then dock each communication signal with each communication channel by switching the physical link in the automatic control relay; or if the host fails to include an automatic control relay, the host uses a software matching mode to firstly match each terminal with each communication channel interface and then dock each communication signal with each communication channel interface by modifying the target communication channel interface address of each communication signal data packet, wherein communication channel interfaces of different addresses transmit different data packets.

6. The system according to claim 5, characterized in that, the locating module is a GPS module, a microphone array, or a 3G network receiver.

7. The system according to claim 5, characterized in that, the host is a device for playing audio signals, and the terminals are sound boxes;

or, the host is a control host, and the terminals are signal lights;

or, the host is a device for playing video signals, and the terminals are display screens.

8. The system according to claim 5, characterized, in that, when the host and the terminals are a plurality of peer-to-peer devices, the host and the terminals configured to communicate with each other and select one of the plurality of peer-to-peer devices as the host and the other of the plurality of peer-to-peer devices as the terminals.

* * * * *